US012479946B2

(12) United States Patent
Duchateau et al.

(10) Patent No.: US 12,479,946 B2
(45) Date of Patent: Nov. 25, 2025

(54) POLYACRYLATE-BASED GRAFT COPOLYMER

(71) Applicant: SABIC GLOBAL TECHNOLOGIES B.V., Bergen op Zoom (NL)

(72) Inventors: Robbert Duchateau, Roostenlaan (NL); Lidia Jasinska-Walc, Veldhoven (NL); Miloud Bouyahyi, Eindhoven (NL); Johannes Peter Antonius Martens, Geleen (NL); Lanti Yang, Bergen op Zoom (NL); Bartosz Prokopowicz, Gdansk (PL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 677 days.

(21) Appl. No.: 17/785,602

(22) PCT Filed: Nov. 12, 2020

(86) PCT No.: PCT/EP2020/081864
§ 371 (c)(1),
(2) Date: Jun. 15, 2022

(87) PCT Pub. No.: WO2021/121795
PCT Pub. Date: Jun. 24, 2021

(65) Prior Publication Data
US 2023/0026134 A1 Jan. 26, 2023

(30) Foreign Application Priority Data

Dec. 19, 2019 (EP) ..................................... 19218051

(51) Int. Cl.
| | | |
|---|---|---|
| *C08F 265/04* | (2006.01) | |
| *C08F 2/38* | (2006.01) | |
| *C08F 8/14* | (2006.01) | |
| *C08F 210/06* | (2006.01) | |
| *C08F 210/14* | (2006.01) | |
| *C08F 212/08* | (2006.01) | |
| *C08F 220/14* | (2006.01) | |
| *C08F 220/18* | (2006.01) | |
| *C08F 293/00* | (2006.01) | |

(52) U.S. Cl.
CPC .............. *C08F 265/04* (2013.01); *C08F 2/38* (2013.01); *C08F 8/14* (2013.01); *C08F 210/06* (2013.01); *C08F 210/14* (2013.01); *C08F 212/08* (2013.01); *C08F 220/14* (2013.01); *C08F 220/1804* (2020.02); *C08F 293/00* (2013.01); *C08F 2438/03* (2013.01); *C08F 2810/40* (2013.01)

(58) Field of Classification Search
CPC ..... C08F 265/04; C08F 265/02; C08F 265/00
See application file for complete search history.

(56) References Cited

U.S. PATENT DOCUMENTS

| | | | |
|---|---|---|---|
| 2004/0116610 A1 | 6/2004 | Torres et al. | |
| 2004/0220346 A1* | 11/2004 | Kaneko ............... | C08F 290/042 525/279 |
| 2005/0203242 A1* | 9/2005 | Nakayama ........... | C09D 151/06 524/570 |
| 2007/0160861 A1* | 7/2007 | Shinoda ................. | C08L 51/06 428/522 |
| 2010/0143651 A1 | 6/2010 | Silvis et al. | |
| 2018/0362747 A1* | 12/2018 | Przybysz ............... | C08L 23/16 |

FOREIGN PATENT DOCUMENTS

| | | |
|---|---|---|
| EP | 1500681 A1 | 1/2005 |
| EP | 1719803 A1 | 11/2006 |
| WO | 2016097203 A1 | 6/2016 |
| WO | 2016097207 A1 | 6/2016 |
| WO | 2016097208 A1 | 6/2016 |

(Continued)

OTHER PUBLICATIONS

Kaneko, Journal of Polymers Science: Part A: Polymer Chemistry, vol. 43, 5103-5118 (2005). (Year: 2005).*
Chung et al.; "Polypropylene-graft-Polycaprolactone: Synthesis and Applications in Polymer Blends"; Macromolecules, vol. 27, No. 6; 1994; pp. 1313-1319.
International Search Report for International Application No. PCT/EP2020/081864; International Filing Date Nov. 12, 2020; Date of Mailing Feb. 9, 2021; 3 pages.
Marathe et al.; "Regioselective Copolymerization of 5-Vinyl-2-norbornene with Ethylene Using Zirconocene-Methylaluminoxane Catalysts: A Facile Route to Functional Polyolefins"; Macromolecules, vol. 27, No. 5; 1994; pp. 1083-1086.
Nomura et al.; "Facile, Efficient Functionalization of Polyolefins via Controlled Incorporation of Terminal Olefins by Repeated 1,7-Octadiene Insertion"; J. Am. Chem. Soc., vol. 129, No. 46; 2007; pp. 14170-14171.
Otera et al.; "Esterification: Methods, Reactions, and Applications"; Wiley-VCH; 2010; 54 Pages.

(Continued)

*Primary Examiner* — Robert C Boyle
(74) *Attorney, Agent, or Firm* — CANTOR COLBURN LLP

(57) ABSTRACT

The invention relates to a polyacrylate-based graft copolymer comprising a polyacrylate backbone and polyolefin side chains grafted thereon, wherein the graft copolymer is prepared by reacting a first polymer and a second polymer, wherein the first polymer comprises recurring units having the structure (I) and optionally further recurring units having the structures (II): Formulae (I), (II) wherein $R^1$, $R^3$ is H or $CH_3$ and $R^2$ is a hydrocarbon moiety comprising 1 to 6 carbon atoms, one of $R^4$ and $R^5$ is H and the other one of $R^5$ and $R^4$ is $COOR^2$, $C\equiv N$, Cl, or an aliphatic or aromatic hydrocarbon moiety optionally containing one or multiple hetero atom functionalities, wherein $R^2$ in (I) is different from $R^2$ in (II) and the second polymer is a functionalized polyolefin having one or multiple hydroxyl functional groups, wherein the graft copolymer is formed by transesterification of the $COOR^2$ group of (I) or (II) with the hydroxyl functional group of the functionalized polyolefin.

19 Claims, 4 Drawing Sheets

(56) References Cited

FOREIGN PATENT DOCUMENTS

| WO | 2017013246 A1 | 1/2017 |
|---|---|---|
| WO | 2017046009 A1 | 3/2017 |
| WO | 2017097617 A1 | 6/2017 |

OTHER PUBLICATIONS

Pitet et al.; "Nanoporous Linear Polyethylene from a Block Polymer Precursor"; J. Am. Chem. Soc. vol. 132, No. 24; 2010; pp. 8230-8231.
Wolf et al.; "Ordered Nanoporous Poly(cyclohexylethylene)"; Langmuir, vol. 19, No. 16; 2003; pp. 6553-6560.
Written Opinion for International Application No. PCT/EP2020/081864; International Filing Date Nov. 12, 2020; Date of Mailing Feb. 9, 2021; 5 pages.

* cited by examiner

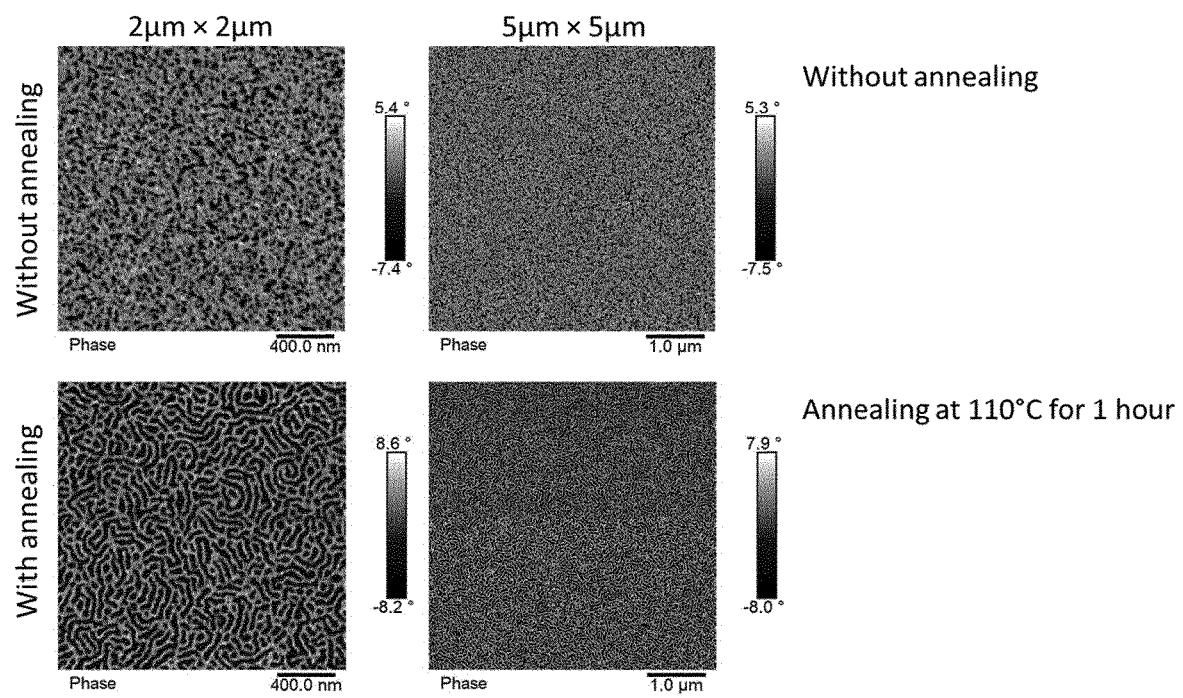
Figure 1. AFM image of PS-block-PBA (Table 4, Entry 2.)

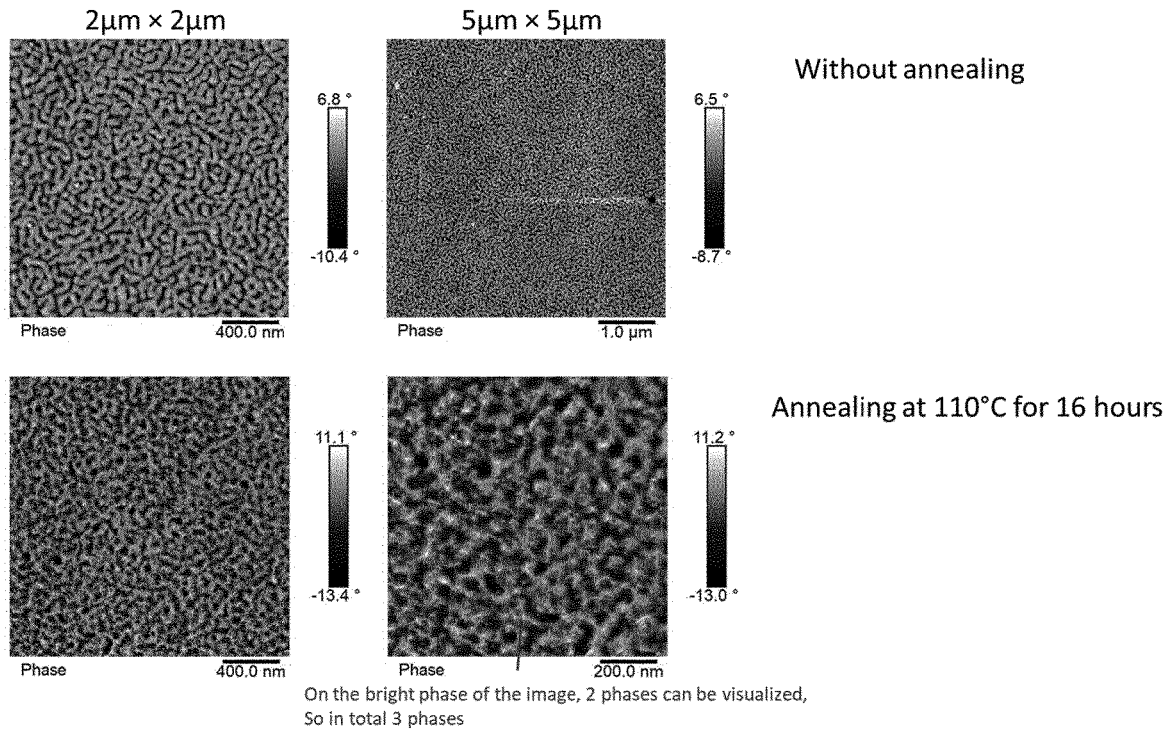
Figure 2. AFM image of PS-block-PBA-graft-iPP (Table 5, Entry 2).
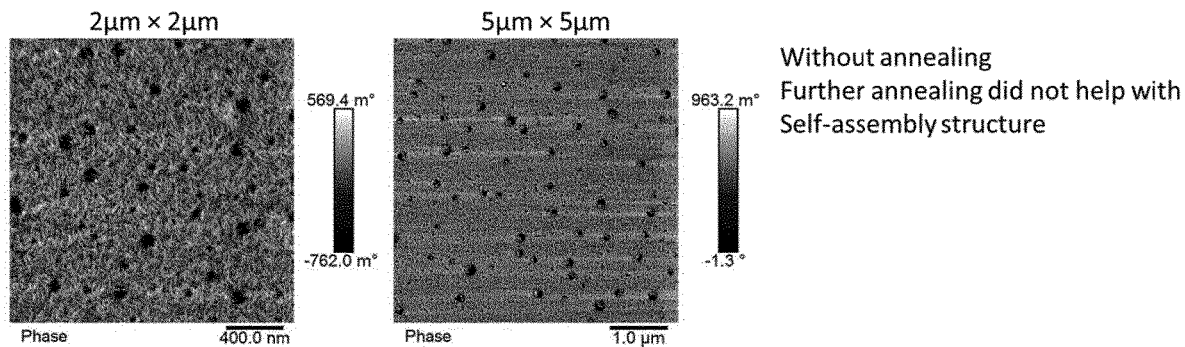
Figure 3. AFM image of PS-block-PMA (Table 4, Entry 5.).

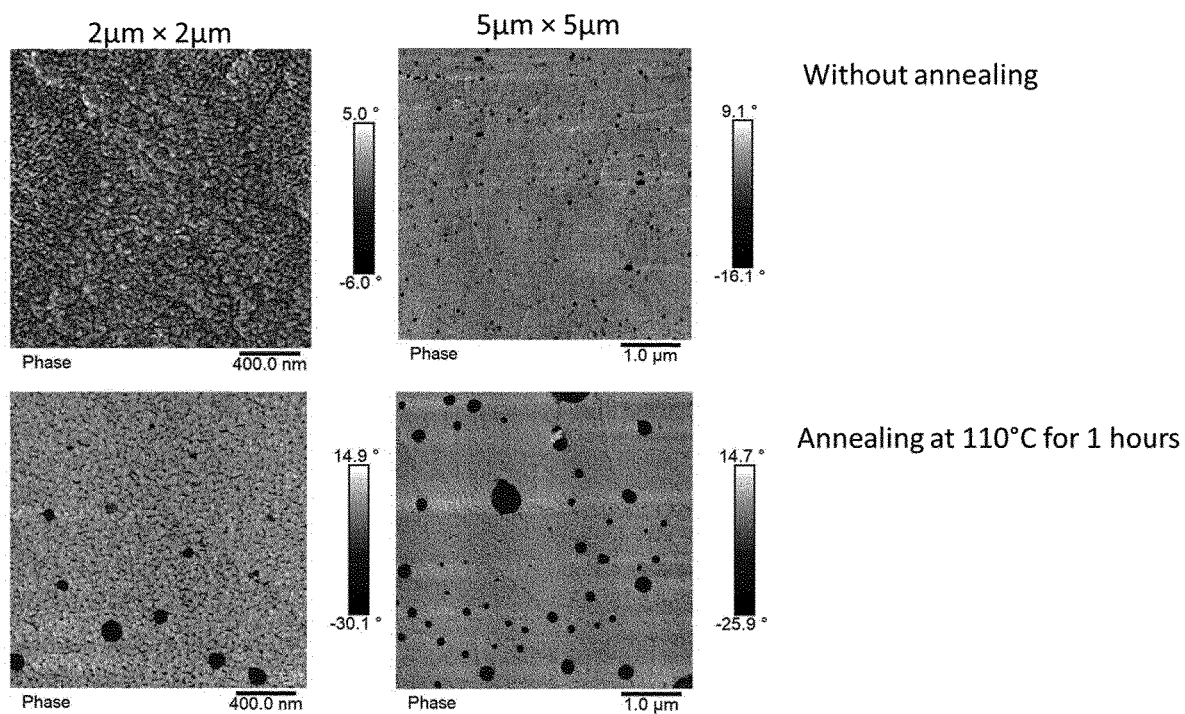
Figure 4. AFM image of PS-block-PMA-graft-PP (Table 5, Entry 1.)

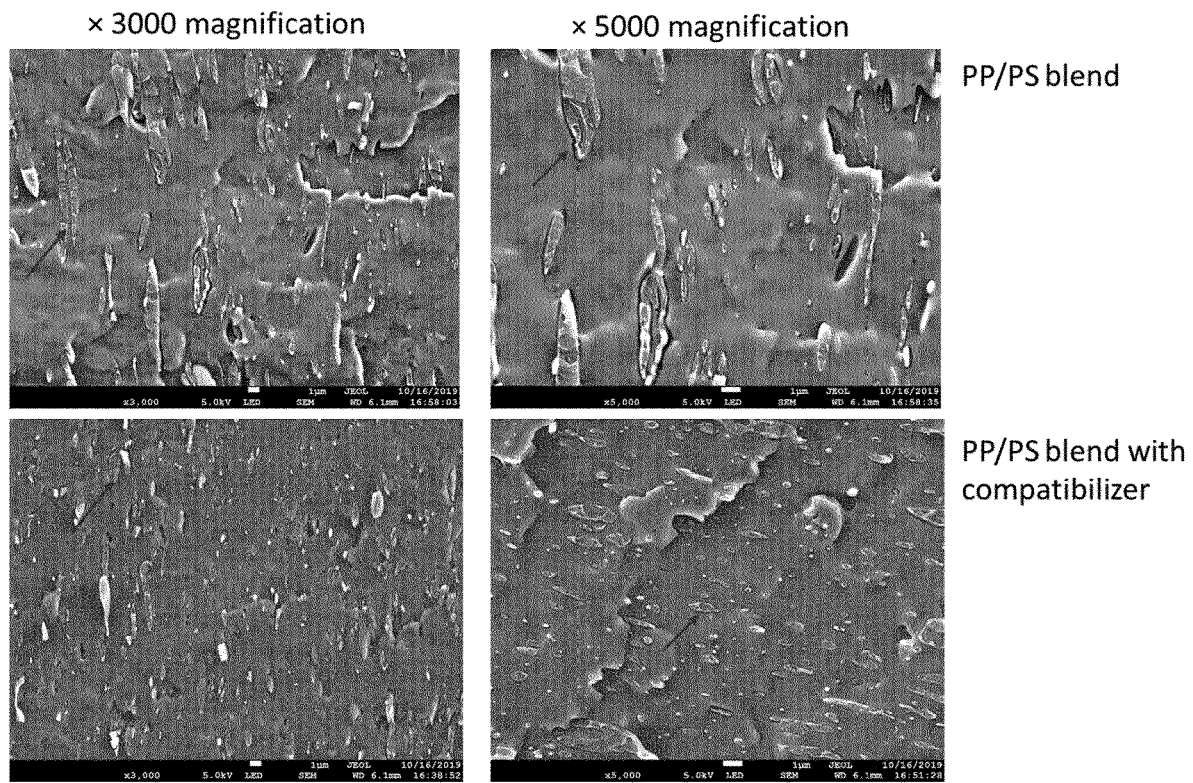
Figure 5. SEM images exhibiting morphology of PP500/PS blend and PP500/PS blend compatibilised by (Table 5, Entry 1.) Red arrow indicates the PS domains visualized in PP matrix

POLYACRYLATE-BASED GRAFT COPOLYMER

CROSS REFERENCE TO RELATED APPLICATIONS

This application is a National Stage application of PCT/EP2020/081864, filed Nov. 12, 2020, which claims the benefit of European Application No. 19218051.1, filed Dec. 19, 2019, both of which are incorporated by reference in their entirety herein.

The present invention relates to a copolymer comprising a polyacrylate part and a polyolefin part. The invention further relates to a process for preparing such copolymer. The invention further relates to compositions and articles comprising such copolymer.

Copolymers based on polyacrylate and polyolefin are known.

US2004/0116610 discloses olefin-based copolymers made by grafting a mono-functional type oligomer, which may be an acrylate oligomer, onto a functionalized polyolefin. The functionalized polyolefin is preferably epoxy functionalized by glycidyl methacrylate or glycidyl acrylate. In example 5, reaction of an oligomer of mono-functional acid methyl methacrylate (HOOC—CH2-S-(MMA)$_{100}$-H) and glycidyl methacrylate ethylene copolymer is described. The mono-functional acid methyl methacrylate is grafted on the glycidyl methacrylate part of the glycidyl methacrylate ethylene copolymer. Epoxides are known to be toxic and these glycidyl methacrylate functionalized polymers are currently under debate as they are associated with health risks.

WO2017/046009 discloses a block copolymer in which polymer A and polymer B are terminally joined:

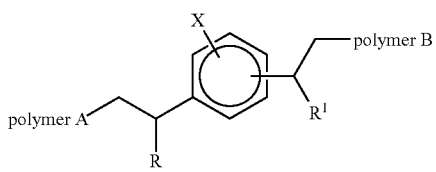

Polymer A may be a polyolefin and polymer B may be derived from a polar monomer such as styrene. The polar monomer may be acrylate. The block copolymer is made by a grafting through approach where an α-methyl styrene-functionalized polyolefin is reacted with vinylic comonomers in a radical polymerization process. This process requires the use of a solvent and thus requires dissolving the polyolefin, which is tedious and expensive and typically limits the molecular weight of the polyolefin that can be applied. Furthermore, diisopropenylbenzene is used as chain end-capping agent in the experiments of WO2017/046009.

Diisopropenylbenzene is a styrenic substance, which for many applications is not allowed to be used in the polymer preparation. Further, as a chain-end functionalized polyolefin is applied, the polyacrylate can be grafted onto the polyolefin only at the chain end of the polyolefin. Hence, the concentration of the functionality in the polyolefin is reversely proportional to the polymer's molecular weight, which lowers the reactivity at increasing molecular weight.

It is an objective of the invention to provide a polyacrylate-based graft copolymer in which the above-mentioned and/or other problems are solved.

Accordingly, the present invention provides a polyacrylate-based graft copolymer comprising a polyacrylate backbone and polyolefin side chains grafted thereon, wherein the graft copolymer is prepared by reacting a first polymer and a second polymer, wherein the first polymer comprises recurring units having the structure (I) and optionally further recurring units having the structures (II):

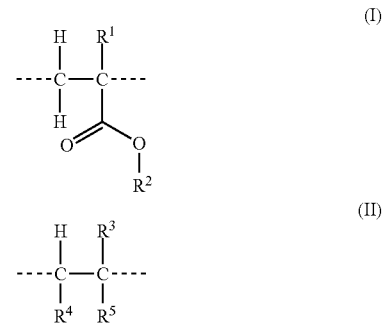

wherein
$R^1$, $R^3$ is H or $CH_3$ and
$R^2$ is a hydrocarbon moiety comprising 1 to 6 carbon atoms,
one of $R^4$ and $R^5$ is H and the other one of $R^5$ and $R^4$ is COOR$^2$, C≡N, Cl, or an aliphatic or aromatic hydrocarbon moiety optionally containing one or multiple hetero atom functionalities,
wherein $R^2$ in (I) is different from $R^2$ in (II) and
the second polymer is a functionalized polyolefin having one or multiple hydroxyl functional groups,
wherein the graft copolymer is formed by transesterification of the COOR$^2$ group of (I) or (II) with the hydroxyl functional group of the functionalized polyolefin.

"transesterification" as used in the present description means: a process of exchanging a nucleophilic alkoxide group of a carboxylic acid ester.

In the polyacrylate-based graft copolymer according to the invention, one or more of the hydroxyl functional group of the polyolefin react with the COOR$^2$ group of the polyacrylate. Thus, the grafting of the polyolefin onto the polyacrylate is not limited to the chain-end of the polyacrylate, such as in the process of US2004/0116610. According to the invention, the efficiency of the coupling of the polyacrylate and the polyolefin may be advantageously controlled by the number of the hydroxyl functional groups per polymer chain of the functionalized polyolefin.

Further, the polyacrylate-based graft copolymer according to the invention can be made without using compounds associated with health risks.

The copolymer according to the invention may be used as a compatibilizer for a polyacrylate and a polyolefin. Further, the copolymer according to the invention may be used for e.g. an adhesive, an impact modifier, in film applications, laminates, fabric, fibers, films, foam or in nanostructured materials such as electronic circuit devices.

First Polymer

The graft copolymer according to the invention is prepared by reacting a first polymer and a second polymer involving transesterification. The first polymer comprises recurring units having the structure (I), i.e. the first polymer is an acrylate polymer.

The recurring units of the first polymer may consist of recurring units (I), in which case the first polymer is an acrylate homopolymer. Alternatively, the first polymer may comprise one or more other types of recurring units (II), in which case the first polymer is an acrylate copolymer. Accordingly, the first polymer may be an acrylate homopolymer, an acrylate random copolymer or an acrylate block copolymer. The recurring units (II) may be acrylate units different from the recurring units (I), in which case the first polymer consists of acrylate recurring units. The recurring units (II) may be non-acrylate units, in which case the first polymer comprises an acrylate part and a non-acrylate part.

Preferably, the fraction of the recurring unit (I) in the recurring units of the first polymer is at least 10 mol %, preferably at least 20 mol %, more preferably at least 30 mol %, for example at least 40 mol %, at least 50 mol %, at least 60 mol %, at least 70 mol %, at least 80 mol %, at least 90 mol % or 100 mol %.

Preferably, the total of the fraction of the recurring unit (I) and the recurring unit (II) wherein $R^5$ or $R^4$ is $COOR^2$ in the recurring units of the first polymer is at least 10 mol %, preferably at least 20 mol %, more preferably at least 30 mol %, for example at least 40 mol %, at least 50 mol %, at least 60 mol %, at least 70 mol %, at least 80 mol %, at least 90 mol % or 100 mol %. The total of the fraction of the recurring unit (I) and the recurring unit (II) wherein $R^5$ or $R^4$ is $COOR^2$ in the recurring units of the first polymer may e.g. be at most 60 mol %, at most 50 mol %, at most 40 mol % or at most 30 mol %.

Preferably, (I) is derived from a monomer selected from the group consisting of: methyl acrylate, methyl methacrylate, ethyl acrylate, ethyl methacrylate, propyl acrylate, propyl methacrylate, butyl acrylate, butyl methacrylate, t-butyl acrylate, t-butyl methacrylate, isobutyl acrylate, isobutyl methacrylate, isopropyl acrylate, isopropyl methacrylate, hydroxyethyl methacrylate, hydroxypropyl acrylate, dimethylaminomethyl acrylate, dimethylaminopropyl acrylate, dimethylaminopropyl methacrylate, dimethylaminomethyl methacrylate, glycidyl methacrylate and diethylene glycol diacrylate.

More preferably, (I) is derived from a monomer selected from the group consisting of: methyl acrylate, methyl methacrylate, butyl acrylate, butyl methacrylate, ethyl acrylate and ethyl methacrylate.

Preferably, (II) is derived from a monomer selected from the group consisting of: methyl acrylate, methyl methacrylate, ethyl acrylate, ethyl methacrylate, propyl acrylate, propyl methacrylate, butyl acrylate, butyl methacrylate, t-butyl acrylate, t-butyl methacrylate, isobutyl acrylate, isobutyl methacrylate, isopropyl acrylate, isopropyl methacrylate, hydroxyethyl methacrylate, hydroxypropyl acrylate, dimethylaminomethyl acrylate, dimethylaminopropyl acrylate, dimethylaminopropyl methacrylate, dimethylaminomethyl methacrylate, glycidyl methacrylate, diethylene glycol diacrylate, styrene, α-methylstyrene, vinyl toluene, vinyl pyridine, chlorostyrene, acrylonitrile, 2-isopropenyl-2-oxazoline, N-vinyl pyrrolidinone, vinyl acetate, vinyl chloride, dimethyl maleate, diethyl maleate, dibutyl maleate, dicyclohexyl maleate, diisobutyl maleate, dioctadecyl maleate, dimethyl fumarate, diethyl fumarate, dibutyl fumarate, dimethylitaconate, diethylitaconate, dibutylitaconate, butadiene, isoprene and combinations thereof.

More preferably, (II) is derived from a monomer selected from the group consisting of: methyl acrylate, methyl methacrylate, butyl acrylate, butyl methacrylate, ethyl acrylate, ethyl methacrylate, styrene, acrylonitrile, butadiene and combinations thereof.

Preferably, the first polymer has a number average molecular weight ($M_n$) of 2 to 150 kg/mol, more preferably 2 to 80 kg/mol, more preferably 3 to 60 kg/mol.

In some embodiments, the first polymer is an acrylate block copolymer comprising a polyacrylate block made of recurring units (I) and a block of recurring units (II) derived from styrene. The block derived from styrene may e.g. have a number average molecular weight ($M_n$) of 1 and 135 kg/mol, preferably 5 to 100 kg/mol, further preferably 5 to 50 kg/mol.

Second Polymer

The second polymer is a polyolefin having one or multiple hydroxyl functional groups.

It was found that the average number of the hydroxyl functional groups per chain influences the reactivity of the second polymer with the first polymer. A higher value of the average number of the hydroxyl functional groups per chain generally leads to a higher reactivity, but undesirable cross-linking occurs when the value is too high.

Preferably, the second copolymer has on average n functional groups per chain, wherein n is 0.5 to 5.0 as determined by $^1$H NMR spectroscopy. The concentration of the functional groups in the second copolymer may be determined by $^1$H NMR spectroscopy and the value n may be calculated by dividing said concentration by the number average molecular weight ($M_n$) to obtain said value n. Preferably, n is 0.8 to 4.5, more preferably 1.0 to 4.0, more preferably 1.2 to 3.5, more preferably 1.4 to 3.0.

In some embodiments, the polyolefin is a propylene-based polymer, which herein means that the amount of recurring units of propylene is at least 90 wt % on the basis of the weight of the second polymer. The propylene-based polymer may comprise further olefin recurring units of e.g. ethylene and/or C4-C8 α-olefins, preferably ethylene or 1-hexene. Preferably, the amount of comonomer-derived units is at most 10 wt %, more preferably at most 5 wt % with respect to the second polymer.

In some embodiments, the polyolefin is an ethylene-based polymer, which herein means that the amount of recurring units of ethylene is at least 90 wt % on the basis of the weight of the second polymer. The ethylene-based polymer may comprise further olefin recurring units of e.g. C3-C8 α-olefins, preferably propylene, 1-hexene or 1-octene. Preferably, the amount of comonomer-derived units is at most 10 wt %, more preferably at most 5 wt % with respect to the second polymer.

In some embodiments, the polyolefin is an ethylene-propylene rubber, which herein means that the amount of recurring units of ethylene is approximately between 45 and 80 wt % on the basis of the weight of the second polymer.

Functionalized polyolefins are per se known and various preparation methods are known.

Preferably, the second polymer has a number average molecular weight ($M_n$) of 1 to 300 kg/mol, more preferably 10 to 150 kg/mol, more preferably 20 to 100 kg/mol.

Polyolefin Main Chain Having Functionalized Short Chain Branches

In some embodiments, the functionalized polyolefin is a copolymer comprising a polyolefin main chain and one or multiple functionalized short chain branches.

Such copolymer may e.g. be prepared by the process described in WO2017/097617, p. 12, l.14-p. 13, l.9.

Thus, in some embodiments, the functionalized polyolefin is a copolymer comprising a polyolefin main chain and one or multiple functionalized short chain branches obtained by or obtainable by a process comprising the steps of:

(D) copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising: i) a metal catalyst or metal catalyst precursor comprising a metal from Group 3-10 of the IUPAC Periodic Table of elements; and ii) optionally a co-catalyst;

(E) reacting the polyolefin obtained in step D) with at least one metal substituting agent to obtain a polyolefin main chain having one or multiple functionalized short chain branches, wherein the functionalized chain end comprises a hydroxyl group.

This has an advantage that the amount of the functionalized group in the functionalized polyolefin can be accurately controlled and can be made large if desired. The large value of the amount of the functionalized group in the functionalized polyolefin ensures a sufficient reaction between the first polymer and the second polymer to obtain the polyacrylate-based graft copolymer according to the invention.

In step (D) at least one first type of olefin monomer, especially for example ethylene or propylene, and at least one second type of metal-pacified functionalized olefin monomer are copolymerized using a catalyst system to obtain a polyolefin main chain having one or multiple metal-pacified functionalized short chain branches.

The catalyst system comprises
i) a metal catalyst or metal catalyst precursor comprising a metal from Group 3-10 of the IUPAC Periodic Table of elements;
ii) optionally a co-catalyst and/or scavenger; and
iii) optionally a chain transfer agent.

Thus in step (D) an olefinic monomer, especially for example ethylene and/or propylene, is copolymerized using for example a pacified hydroxyl functionalized olefin comonomer in the presence of a catalyst and a cocatalyst, similarly as any other catalytic olefin copolymerization, with the difference that the hydroxyl-functionalized olefinic comonomer is pacified by reacting it with a metal hydrocarbyl, especially for example an aluminum alkyl such as for example triisobutylaluminum (TiBA), prior to and/or during the copolymerization.

In step (E) the polyolefin main chain having one or multiple metal-pacified functionalized short chain branches obtained in step D) is reacted with at least one metal substituting agent to obtain a polyolefin main chain having one or multiple hydroxyl-functionalized short chain branches. Thus, during step (E), the protective group is removed by treating the product of step D) with a protic agent such as acidified alcohol, as metal substituting agent. The product of step (E) is a random copolymer of an olefin, especially for example propylene and/or ethylene, and a hydroxyl-functionalized olefin, where the hydroxyl functionalities may be located on the short chain branches, especially for example at their ends.

The copolymer comprising a polyolefin main chain and one or multiple functionalized short chain branches has an advantage that it is relatively easy to obtain a high value of the average number n of functional groups per chain. This high value of n can be obtained irrespective of the type of the polyolefin main chain, also when the polyolefin is a propylene-based polymer.

Thus, in some preferred embodiments, the second polymer is a copolymer comprising a polyolefin main chain and one or multiple functionalized short chain branches, wherein the second polymer has on average n functional groups per chain, wherein n is 1.0 to 4.0, preferably 1.2 to 3.5, more preferably 1.4 to 3.0.

In some preferred embodiments, the second polymer is a propylene-based polymer and is a copolymer comprising essentially a polypropylene main chain comprising one or multiple functionalized short chain branches, wherein the second polymer has on average n functional groups per chain, wherein n is 1.0 to 4.0, more preferably 1.2 to 3.5, more preferably 1.4 to 3.0.

The at least one first type of olefin monomer is selected such that the obtained polyolefin is a propylene-based polymer or an ethylene-based polymer as described elsewhere.

Thus, in some embodiments, the at least one first type of olefin monomer is propylene.

In some embodiments, the at least one first type of olefin monomer is propylene and ethylene and/or C4-C8 α-olefin.

In some embodiments, the at least one first type of olefin monomer is ethylene.

In some embodiments, the at least one first type of olefin monomer is ethylene and C3-C8 α-olefin.

Preferably, the at least one second type of metal-pacified functionalized olefin monomer is a compound according to Formula III

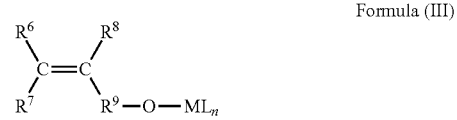

Formula (III)

wherein $R^6$, $R^7$ and $R^8$ are each independently selected from the group consisting of H or hydrocarbyl with 1 to 16 carbon atoms, and wherein $R^9$—O-$ML_n$ is a main group metal pacified hydroxyl functional group, wherein $R^9$ is a hydrocarbyl with 1 to 16 carbon atoms;

wherein M is the pacifying metal, preferably selected from the group consisting of: magnesium, calcium, boron, aluminum, gallium, bismuth, titanium, zinc, and one or more combinations thereof;

wherein ligand L is independently selected from the group consisting of hydride, hydrocarbyl, halide, alkoxide, aryloxide, amide, thiolate, mercaptate, carboxylate, carbamate, salen, salan, salalen, guanidinate, porphyrin, beta-ketiminate, phenoxy-imine, phenoxy-amine, bisphenolate, trisphenolate, alkoxyamine, alkoxyether, alkoxythioether, subcarbonate and subsalicylate or combinations thereof;

wherein n is 1, 2 or 3.

Preferably, the compound according to Formula III is a metal-pacified hydroxyl α-olefin or metal-pacified hydroxyl-functionalized ring-strained cyclic olefin monomer, preferably an aluminum-pacified hydroxyl olefin monomer. Metal-pacified hydroxyl α-olefin monomers correspond to Formula III wherein $R^6$, $R^7$, and $R^8$ are each H and wherein $R^9$ is either —$C(R^{10})(R^{11})$— or a plurality of —$C(R^{10})(R^{11})$— groups, wherein $R^{10}$, and $R^{11}$ are each independently selected from the group consisting of H or hydrocarbyl with 1 to 16 carbon atoms. An example of an $R^9$ group is —$(CH_2)_2$— or —$(CH_2)_9$—.

The functionalized polyolefin may comprise recurring units of a functionalized comonomer, preferably allyl alcohol, such as 3-buten-1-ol, 5-hexen-1-ol, 7-octen-1,2-diol or 11-undecen-1-ol.

Preferably, the metal catalyst or metal catalyst precursor used in step (D) comprises a metal from Group 3-8, preferably Group 3-6, more preferably from Group 3-4 of the IUPAC Periodic Table of elements and/or wherein the metal catalyst or metal catalyst precursor used in step (D) comprises a metal selected from the group consisting of Ti, Zr, Hf, V, Cr, Fe, Co, Ni, Pd, preferably Ti, Zr or Hf.

Preferably, the co-catalyst is selected from the group consisting of MAO, DMAO, MMAO, SMAO, fluorinated aryl borane or fluorinated aryl borate. MAO has the general Formula $(Al(CH_3)_{3-n}O_{0.5n})_x$—$(AlMe_3)_y$ having an aluminum oxide framework with methyl groups on the aluminum atoms. MAO generally contains significant quantities of free trimethyl aluminum (TMA), which can be removed by drying the MAO to afford the so-called depleted MAO or DMAO. Supported MAO (SMAO) may also be used and may be generated by the treatment of an inorganic support material, typically silica, by MAO.

Further details of the preparation of such copolymer is process described in detail in WO2016/097207, incorporated herein by reference, particularly in sections describing step A) of the process of the invention of WO2016/097207.

According to the invention, the so-obtained second copolymer which is a polyolefin having functionalized short chain branches is reacted with the first copolymer to form the graft copolymer according to the invention by transesterification of the $COOR^2$ group of (I) with the functional group of the functionalized polyolefin.

Alternatively, the polyolefin main chain having functionalized short chain branches may e.g. be prepared by the process described in WO2017/013246.

Alternatively, the polyolefin main chain having functionalized short chain branches may e.g. be prepared by the process described in *Macromolecules* 1994, 27, 1313-1319, *Macromolecules* 1994, 27, 1083-1086 or *J. Am. Chem. Soc.* 2007, 129, 14170-14171.

End-Functionalized Polyolefin

In some embodiments, the functionalized polyolefin is a polyolefin containing at least one functionalized chain end.

Such copolymer may e.g. be prepared by the process described in WO2017/097617, p. 10, l.9 to p. 11, l.2.

Thus, in some embodiments, the functionalized polyolefin is a polyolefin containing at least one functionalized chain end obtained by or obtainable by a process comprising the steps of:
 (A) polymerizing at least one type of olefin monomer using a catalyst system to obtain a first polyolefin containing a main group metal on at least one chain end; the catalyst system comprising
 i) a metal catalyst or metal catalyst precursor comprising a metal from Group 3-10 of the IUPAC Periodic Table of elements; and
 ii) at least one type of chain transfer agent; and
 iii) optionally a co-catalyst, and
 (B) reacting the first polyolefin containing a main group metal on at least one chain end obtained in step A) with at least one type of oxidizing agent and subsequently at least one type of metal substituting agent to obtain the polyolefin containing at least one functionalized chain end which comprises a hydroxyl group.

Thus, in step (A) a polyolefin, with or without comonomer, can be prepared by means of coordinative chain transfer polymerization (CCTP) in the presence of a catalyst, cocatalyst, at least one type of chain transfer agent and optionally an additional chain shuttling agent. Chain transfer and/or chain shuttling agents used are typically for example aluminum-, boron- and/or zinc hydrocarbyl species. This process results in polyolefin chains that are end-functionalized with a metal atom, which is susceptible to react with an oxidizing agent such as molecular oxygen.

In a step (B) the first polyolefin containing a main group metal on at least one chain end obtained in step (A) may be reacted with at least one type of oxidizing agent (for example molecular oxygen) and subsequently at least one type of metal substituting agent (for example acidified alcohol) to obtain a first polyolefin containing at least one hydroxyl functionalized chain end.

It will be appreciated that "a polyolefin containing at least one hydroxyl functionalized chain end" means that the polymer comprises polymer chains with at least one hydroxyl functionalized chain end. The polymer typically comprises polymer chains without any hydroxyl functionalized chain end.

The polyolefin may have one hydroxyl functionalized chain end, which means that the maximum number of hydroxyl functionalized chain end in a polymer chain in the polyolefin is one. Due to the presence of polymer chains without any hydroxyl functionalized chain end, the average number of the hydroxyl functional groups per chain is typically 0.5 to 1.0, more typically 0.7 to 0.9, for example 0.8, as determined by $^1H$ NMR spectroscopy.

The polyolefin may have two hydroxyl functionalized chain end, which means that the number of hydroxyl functionalized chain end in a polymer chain in the polyolefin is two. In this case, the average number of the hydroxyl functional groups per chain is typically 1.0 to 2.0, more typically 1.4 to 1.8, for example 1.6, as determined by $^1H$ NMR spectroscopy.

Preferably, the metal catalyst or metal catalyst precursor used in step (A) comprises a metal from Group 3-10, preferably Group 3-6, more preferably from Group 3-4 of the IUPAC Periodic Table of elements. More preferably, the metal catalyst or metal catalyst precursor used in step A) comprises a metal selected from the group consisting of Ti, Zr, Hf, V, Cr, Fe, Co, Ni, Pd, preferably Ti, Zr or Hf.

Preferably, the co-catalyst is selected from the group consisting of MAO, DMAO, MMAO, SMAO and fluorinated aryl borane or fluorinated aryl borate.

The at least one type of olefin monomer is selected such that the obtained polyolefin is a propylene-based polymer or an ethylene-based polymer as described elsewhere.

Thus, in some embodiments, the at least one type of olefin monomer is propylene.

In some embodiments, the at least one type of olefin monomer is propylene and ethylene and/or C4-C8 α-olefin.

In some embodiments, the at least one type of olefin monomer is ethylene.

In some embodiments, the at least one type of olefin monomer is ethylene and C3-C8 α-olefin.

Preferably, the chain transfer agent is a main group metal hydrocarbyl or a main group metal hydride, preferably selected from the group consisting of: hydrocarbyl aluminum, hydrocarbyl magnesium, hydrocarbyl zinc, hydrocarbyl gallium, hydrocarbyl boron, hydrocarbyl calcium, aluminum hydride, magnesium hydride, zinc hydride, gallium hydride, boron hydride, calcium hydride and one or more combinations thereof.

Preferably, the chain transfer agent is selected from the group consisting of trialkyl boron, trialkyl aluminum, dialkyl aluminum hydride, dialkyl magnesium, diaryl magnesium, dialkyl zinc, alkyl zinc hydride alkyl zinc alkoxide, alkyl zinc aryloxide, alkyl zinc amide, alkyl zinc thiolate, alkyl zinc carboxylate, alkyl zinc phosphide, alkyl zinc mercaptanate, alkyl zinc siloxide, alkyl zinc stannate, and one or more combinations thereof, preferably trimethyl aluminum (TMA), triethyl aluminum (TEA), tri-isobutyl aluminum, di(isobutyl) aluminum hydride, di(n-butyl) magnesium, n-butyl(ethyl)magnesium, dimethyl zinc, diethyl zinc, or triethylboron, and one or more combination thereof.

Preferably, the at least one oxidizing agent in step (B) is selected from the group consisting of $O_2$, $O_3$, $N_2O$, and epoxide, preferably $O_2$.

Further details of the preparation of such polymer is process described in detail in WO2016/097203, incorporated herein by reference, particularly in sections describing steps A) and B) of the process of the invention of WO2016/097203.

According to the invention, the so-obtained second copolymer which is a polyolefin containing at least one hydroxyl functionalized chain end is reacted with the first copolymer to form the graft copolymer according to the invention by transesterification of the $COOR^2$ group of (I) with the hydroxyl functional group of the functionalized polyolefin.

Alternatively, the end-functionalized polyolefin may e.g. be prepared by the process described in *Langmuir* 2003, 19, 6553-6560 or *J. Am. Chem. Soc.* 2010, 132, 8230-8231.

Functionalized Polyolefin Made Using Alkanolamine

In some embodiments, the functionalized polyolefin is obtained by or obtainable by a process comprising the following steps:

(F) grafting onto the backbone of a polyolefin at least one compound comprising at least one amine-reactive group to form a grafted polyolefin and (G) reacting an alkanolamine with the grafted polyolefin.

Preferably, step (G) takes place subsequent to step (F) without the isolation of the grafted polyolefin. Preferably, both steps (F) and (G) take place in a melt reaction.

The term "amine-reactive group," as used, refers to a chemical group or chemical moiety that can react with an amine group.

The method of the preparation of such hydroxyl functionalized polyolefin is per se known and described in detail e.g. in US20100143651, part of which is incorporated herein below.

Examples of the amine-reactive group include anhydride groups, ester groups and carboxylic acid groups. Most preferably, the amine-reactive group is an anhydride group, in particular a cyclic anhydride group.

Examples of the compound comprising an amine-reactive group to be grafted onto the backbone of a polyolefin include ethylenically unsaturated carboxylic acids such as maleic acid, fumaric acid, itaconic acid, acrylic acid, methacrylic acid, and crotonic acid; acid anhydrides such as maleic anhydride and itaconic anhydride; vinyl benzyl halides such as vinyl benzyl chloride and vinyl benzyl bromide; alkyl acrylates and methacrylates such as methyl acrylate, ethyl acrylate, butyl acrylate, lauryl acrylate, methyl methacrylate, ethyl methacrylate, butyl methacrylate, and lauryl methacrylate; and ethylenically unsaturated oxiranes, such as glycidyl acrylate, glycidyl methacrylate, and glycidyl ethacrylate.

Preferred ethylenically unsaturated amine-reactive compounds include maleic anhydride, acrylic acid, methacrylic acid, glycidyl acrylate, glycidyl methacrylate.

Most preferably, the compound comprising an amine-reactive group is maleic anhydride.

In some embodiments, the polyolefin of the grafted polyolefin is a propylene-based polymer, which herein means that the amount of recurring units of propylene is at least 90 wt % on the basis of the weight of the second polymer. The propylene-based polymer may comprise further olefin recurring units of e.g. ethylene and/or C4-C8 α-olefins, preferably ethylene or 1-hexene. Preferably, the amount of comonomer-derived units is at most 10 wt %, more preferably at most 5 wt % with respect to the second polymer.

In some embodiments, the polyolefin of the grafted polyolefin is an ethylene-based polymer, which herein means that the amount of recurring units of ethylene is at least 90 wt % on the basis of the weight of the second polymer. The ethylene-based polymer may comprise further olefin recurring units of e.g. C3-C8 α-olefins, preferably propylene, 1-hexene or 1-octene. Preferably, the amount of comonomer-derived units is at most 10 wt %, more preferably at most 5 wt % with respect to the second polymer.

The amount of the compound reactive with the amino group of the alkanolamine with respect to the grafted polyolefin may e.g. be 0.01 to 10 wt %, for example 0.1 to 5 wt %, 0.2 to 2 wt % or 0.3 to 1 wt %.

When the polyolefin is an ethylene-based polymer, more than one amine-reactive compound can be easily grafted onto the backbone of the polyolefin. However, when the polyolefin is a propylene-based polymer, it is difficult to graft more than one amine-reactive compound onto the backbone of the polyolefin while keeping an appreciable molecular weight, due to competitive beta-scission.

Thus, in some embodiments, the second copolymer is obtained by or obtainable by the process comprising steps (F) and (G), wherein the second polymer has on average n functional groups per chain, wherein n is 1.0 to 4.0, preferably 1.2 to 3.5, more preferably 1.4 to 3.0, as determined by $^1$H NMR spectroscopy.

In some embodiments, the second copolymer is an ethylene-based polymer and is obtained by or obtainable by the process comprising steps (F) and (G), wherein the second polymer has on average n functional groups per chain, wherein n is 1.0 to 4.0, preferably 1.2 to 3.5, more preferably 1.4 to 3.0, as determined by $^1$H NMR spectroscopy.

In some embodiments, the second copolymer is a propylene-based polymer and is obtained by or obtainable by the process comprising steps (F) and (G), wherein the second polymer has on average n functional groups per chain, wherein n is 0.5 to 1.0, as determined by $^1$H NMR spectroscopy.

The amine-reactive group can be grafted to the polymer by any known method, typically in the presence of a free radical initiator, for example peroxides and azo compounds, or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate, t-butyl cumyl peroxide, di-t-butyl peroxide, di-t-amyl peroxide, t-amyl peroxybenzoate, 1,1-bis(t-butylperoxy)-3,3,5-trimethylcyclohexane, a,a'-bis(t-butylperoxy)-1,3-diisopropylbenzene, a,a'-bis(t-butylperoxy)-1,A-diisopropylbenzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

The grafting reaction should be performed under conditions that maximize grafts onto the polyolefin backbone, and minimize side reactions, such as the homopolymerization of the grafting agent, which is not grafted to the polyolefin. The grafting reaction may be performed in the melt, in solution, in the solid-state, in a swollen-state, and is preferably performed in the melt. The grafting reaction may be performed in a wide-variety of equipment, such as, but not limited to, twin-screw extruders, single screw extruders, Brabender mixers, and batch reactors.

The grafting may e.g. be performed by mixing the polyolefin with the amine-reactive compound in a melt, e.g. at a temperature of 120 to 260° C., for example 130 to 250° C.

Preferably, the alkanolamine is selected from the group consisting of ethanolamine, 2-amino-1-propanol, 3-amino-1-propanol, 2-amino-1-butanol, aminobenzyl alcohol, 2-amino-1,3-propanediol, 3-amino-1,2-propanediol, 2-amino-2-methylpropane-1,3-diol, tris(hydroxymethyl) aminomethane.

The reaction of the alkanolamine with the grafted polyolefin may e.g. be performed by mixing the alkanolamine with the grafted polyolefin in a melt.

Transesterification Process

The transesterification reaction of the polyacrylate and the functionalized polyolefin can be carried out in the presence of a suitable catalyst. A wide variety of catalysts is available as described in e.g. WO2016097208, p. 51, l.7-23:

Suitable examples of catalysts include mineral acids, organic acids, organic bases, metallic compounds such as hydrocarbyls, oxides, chlorides, carboxylates, alkoxides, aryloxides, amides, salen complexes, β-ketiminato complexes, guanidinato complexes of tin, titanium, zirconium, aluminum, bismuth, antimony, magnesium, calcium and zinc and lipase enzymes. Examples of suitable catalysts are as reported by J. Otera and J. Nishikido, Esterification, p. 52-99, Wiley 2010.

Examples of the organic acid as catalysts for the transesterification according to the present invention include diethylether complex of hydrogen chloride, fluorosulfonic acid, trifluoromethanesulfonic acid, methyl trifluorosulfonate, ethyl trifluoromethane-sulfonate n-propyl trifluorosulfonate, and i-propyl trifluorosulfonate)), metal (yttrium, aluminum, bismuth) triflates. The organic acid may also be selected from a group of compounds that are formed by combining a strong Lewis acid and a strong Bronsted acid. A specific example of such a compound is an equimolar combination of fluorosulfonic acid and antimony pentafluoride.

Specific examples of the suitable catalysts include triazabicyclodecene (TBD), titanium tetraisopropoxide (Ti(OiPr)$_4$), tin bis(2-ethyl-hexanoate), dibutyl tin oxide, aluminum triisopropoxide and trimethyl aluminum (TMA).

The amount of the transesterification catalyst used may e.g. be 0.0001 to 0.5 wt %, preferably 0.001 to 0.1% wt % based on the amount of the polyacrylate.

In one aspect, the invention provides a process for the preparation of a polyacrylate-based graft copolymer comprising a polyacrylate backbone and polyolefin side chains grafted thereon, comprising the step of reacting a first polymer and a second polymer, wherein the first polymer comprises recurring units having the structure (I) and optionally further recurring units having the structures (II):

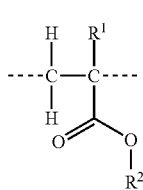

(I)

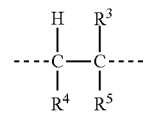

(II)

wherein $R^1$, $R^3$ is H or $CH_3$ and $R^2$ is a hydrocarbon moiety comprising 1 to 6 carbon atoms, one of $R^4$ and $R^5$ is H and the other one of $R^5$ and $R^4$ is $COOR^2$, C≡N, Cl, an aliphatic or aromatic hydrocarbon moiety optionally containing one or multiple hetero atom functionalities, wherein $R^2$ in (I) is different from $R^2$ in (II) and the second polymer is a functionalized polyolefin having one or multiple hydroxyl functional groups, wherein the graft copolymer is formed by transesterification of the $COOR^2$ group of (I) or (II) with the hydroxyl functional group of the functionalized polyolefin.

In some embodiments, the process according to the invention further comprises steps (D) and (E) to obtain the second polymer, which is the copolymer comprising the polyolefin main chain and one or multiple functionalized short chain branches.

In some embodiments, the process according to the invention further comprises steps (A) and (B) to obtain the second polymer which is the polyolefin containing at least one functionalized chain end.

In some embodiments, the process according to the invention further comprises steps (F) and (G) to obtain the second polymer.

The transesterification reaction of the polyacrylate and the functionalized polyolefin can be performed by a solution process, i.e. it is carried out in an organic solvent, for example aliphatic hydrocarbon solvents such as heptane, octane and decaline and aromatic hydrocarbon solvents such as toluene and xylene. Other examples of the organic solvent include dimethylformamide and tetrachloroethane.

The transesterification reaction of the polyacrylate and the functionalized polyolefin can be performed in a melt, such as by reactive melt extrusion. This is advantageous in that the tedious and expensive process of dissolving the functionalized polyolefin in the organic solvent is avoided.

The invention further provides an a composition comprising a polyacrylate, a polyolefin and a compatibilizer, wherein the compatibilizer is the polyacrylate-based graft copolymer according to the invention.

The invention further provides an article comprising the polyacrylate-based graft copolymer according to the invention or a composition comprising a polyacrylate, a polyolefin and a compatibilizer, wherein the compatibilizer is the polyacrylate-based graft copolymer according to the invention, preferably wherein the article is selected from the group consisting of an adhesive, an impact modifier, laminates, fabric, fibers, films, foam and nanostructured materials such as electronic circuit devices.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Abbreviations poly($C_3$-co-$C_{11}$OH)—isopolypropylene-co-10-undecen-1-ol
PS-b-PA—polystyrene-block-polyacrylate

EXPERIMENTAL SECTION

General Considerations. All operations were carried out in a nitrogen-filled glovebox and polymerisation reactions were performed under nitrogen atmosphere. Reagents 2,2'-Azobis(2-methylpropionitrile) (AIBN, 98%), methyl acrylate (99%), butyl acrylate (≥99%), 2-(dodecylthiocarbonothioylthio)-2-methylpropionic acid (DDMAT, 98%), 1-dodecanethiol (98%) and solvents anhydrous toluene (99.8%), tetrahydrofuran (≥99.9%) and anhydrous dichloromethane (≥99.8%) were purchased from Sigma-Aldrich and used without further purification. Polymers were dried with Dean-Stark apparatus for at least 24 h before each reaction.

High temperature Size Exclusion Chromatography (HT-SEC). Measurements were performed at 150° C. on a Polymer Char GPC-IR® built around an Agilent GC oven model 7890, equipped with an autosampler and the Integrated Detector IR4. 1,2-dichlorobenzene (o-DCB) was used as an eluent at a flow rate of 1 mL/min. The data were processed using Calculations Software GPC One®. The molecular weights were calculated with respect polystyrene standards.

Size Exclusion Chromatography (SEC). Measurements were performed at room temperature on a Agilent Technologies 1200 series GPC system equipped with a refractive index detector. Dichloromethane (DCM) was used as an eluent at a flow rate of 0.3 mL/min. The molecular weights were calculated with respect poly(methyl methacrylate) standards.

Liquid-state $^1$H NMR. $^1$H NMR and $^{13}$C NMR spectra were recorded at room temperature or at 80° C. using a Varian Mercury Vx spectrometer operating at Larmor frequencies of 500 MHz and 100.62 MHz for $^1$H and $^{13}$C, respectively. For $^1$H NMR experiments, the spectral width was 6402.0 Hz, acquisition time 1.998 s and the number of recorded scans equal to 64. $^{13}$C NMR spectra were recorded with a spectral width of 24154.6 Hz, an acquisition time of 1.3 s, and 256 scans. The amount of OH groups in the functionalized PO was estimated using $CH_2$—OH signals area present around 3.5 ppm.

Spin-Coated Film Annealing for Atomic Force Microscopy (AFM) Analysis.

Different types of PS-PA and PS-PA-PP copolymers were spin-coated onto silicon wafer. To achieve self-assemble microphase separation structure of the spin-coated films. Samples are treated with annealing procedures before AFM imaging. Detailed annealing procedures have been specified in the images.

Self-Assembly Morphology Characterizations by AFM

AFM characterization was performed at Dimension Fast-Scan AFM system from Bruker utilizing tapping mode AFM tips (Model TESPA-V2, k: 42 N/m, f: 320 kHz). The software Nanoscope Analysis 1.5 from Bruker was used as the computer interface for operation and analysis of AFM measurements. All AFM measurements were performed at ambient conditions. Height and phase images were recorded simultaneously at a scan rate of 1 Hz with a resolution of 512×512 pixels. Optical imaging integrated in the AFM setup was first used before AFM measurement to select the area of interest for imaging.

PP/PS Blends Morphology Characterization by SEM Imaging

The cross-sectional morphologies of both the PP/PS blend prepared without compatibilizer and the PP/PS blend compatibilized by PS-co-PMA-graft-PP were examined with a JEOL JSM 7800-F Field Emission Scanning Electron Microscopy (FE-SEM) at an operating voltage of 5 kV using LED detector. Before imaging, the molded samples were cryogenically fractured for the cross-sectional morphology characterization. Also both the samples were sputter-coated with gold-palladium in order to reduce the surface charging during SEM imaging.

Preparation of poly($C_3$-co-$C_{11}$OH) (Table 1, Entry 1)

The propylene copolymerization experiment with 10-undecen-1-ol (entry 1, Table 1) was carried out in a stainless steel autoclave (20 L). The reactor was first washed with PMH (10 L) and vigorously stirred (500 rpm) for about 120 min at 180° C. After draining off the washing solvent, the reactor conditioning stared by applying a pre-set procedure (150° C. and three cycles of vacuum (10 mbar), nitrogen (2 bar), total time 60 min). Pentamethyl heptane "PMH" was added (15 L) and temperature was set at 80° C. under continuous stirring (300 rpm). Solutions of TiBA (1.0 M solution in toluene, 20.0 mmol), TiBA protected 10-undecen-1-ol (1.0 M solution in toluene, 25 mL, TiBA/C11OH=1) and MAO (30 wt % solution in toluene, 45 mmol) were added. The propylene is dosed continuously into the reactor under a stirring speed of 300 rpm until reaching full solvent saturation (propylene uptake null as measured by Bronkhorst mass flow controller) in about 90 min, 80° C. and 5 bar partial propylene pressure. Once the saturation of PMH solvent is completed, DEZ (1.0 M in hexanes, 5.0 mL diluted in about 10 mL toluene) was injected applying a 1 bar N2 overpressure, immediately followed by the injection of a catalyst solution in toluene (0.5 mg catalyst powder dissolved in about 15 mL toluene, 0.8 μmol) applying a 1 bar N2 overpressure. The pressure set point is raised to match the pressure after injecting DEZ and catalyst solutions to keep the partial propylene pressure at 5 bar. After 50 minutes, the mixture was drawn off via a bottom valve in a container (equipped with a filter) containing a mixture of pure isopropanol (1.0 L) and acidified isopropanol (2.5% v/v CH3COOH, 1.0 L). After cooling down the drained suspension, the filtration was started by opening the valve of dumping vessel. The obtained solid was washed with demineralized water and dried at 60° C. in vacuo overnight (303 g). The functionalization level (OH in mol. %) was determined using $^1$H NMR to be 0.15 mol. %. The OH content was calculated using the ratio of the triplet corresponding to the polypropylene PP-grafted 10-undecen-1-ol branch (CH$_2$—CH(CH$_2$)$_8$—CH$_2$—OH) versus the multiplet corresponding to [CH$_3$(CH)(CH$_2$)]$_n$— of the PP backbone.

This experiment was repeated by varying conditions viz. TIBA and DEZ concentration as well as 1-hexene and functionalized comonomer concentration. Results are summarized in Table 1. 1-Hexene (2 mL) was used in addition to propylene for entries 4 and 5. Entries 1, 5 and 6 were performed in a 20 L reactor instead of a 2 L reactor. Entry 6 was performed using a 3 times higher concentration of functionalized comonomer.

Polymerisation of Methyl Acrylate (Table 2, Entry 1).

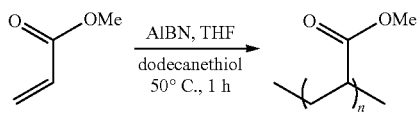

Methyl acrylate (391 mL, 4.3 mol) was purified by passing it over a column containing basic alumina. Methyl acrylate was dissolved in THF (40 wt %), the mixture was degassed using three vacuum/nitrogen cycles and was heated to 50° C. after which AIBN (82 mg, 0.5 mmol) and dodecanethiol (43 µL, 0.25 mmol) were added. After one hour, solvent and unreacted monomer were removed under reduced pressure and the crude product was precipitated in cold (cooled with liquid nitrogen) methanol and filtrated. After drying in a vacuum oven (60° C.) poly(methyl acrylate) was obtained as a transparent solid. Yield: 297 g (80%), HT SEC (IR detector, o-DCB): $M_n$=3,200 g/mol, Đ=2.0 and SEC (RI detector, CH$_2$Cl$_2$): $M_n$=10,200 g/mol, Đ=2.1.

Polymerisation of Butyl Acrylate (Table 2, Entry 2).

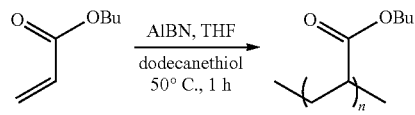

Butyl acrylate (42 mL, 0.29 mol) was purified by passing it over a column containing basic alumina. Methyl acrylate was dissolved in THF (40 wt %), the mixture was degassed using three vacuum/nitrogen cycles and was heated to 50° C. after which AIBN (82 mg, 0.5 mmol) and dodecanethiol (43 µL, 0.25 mmol) were added. After one hour, solvent and unreacted monomer were removed under reduced pressure and the crude product was precipitated in cold methanol and filtrated. After drying in a vacuum oven (60° C.) poly(butyl acrylate) was obtained as a transparent gel. Yield: 32 g, (84%), HT SEC (IR detector, o-DCB): $M_n$=9,800 g/mol, Đ=2.4 and SEC (RI detector, CH$_2$Cl$_2$): $M_n$=16,500 g/mol, Đ=2.0.

Polymerisation of Styrene (Table 2, Entry 4)

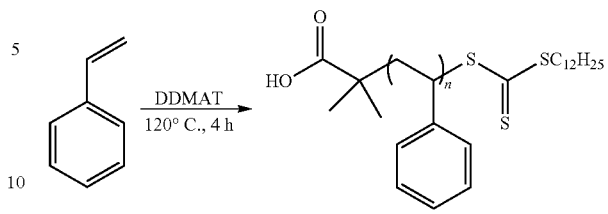

A mixture of styrene (50 mL, 0.43 mol) and DDMAT (0.16 g, 0.43 mmol) was degassed using three vacuum/nitrogen cycles and then was placed on a preheated reaction block at 120° C. After four hours, solvent and unreacted monomer were removed under reduced pressure and the crude product was precipitated in cold methanol. The resulting product was dried under vacuum at 70° C. to give a yellow solid (yield: 17.2 g (38%), HT SEC (IR detector, o-DCB): $M_n$=21,000 g/mol; Đ=1.2 and SEC (RI detector, CH$_2$Cl$_2$, PS standards): $M_n$=20,300 g/mol, Đ=1.3.

This experiment (Table 2, Entry 4) was repeated by varying conditions viz. amount of used radical initiator and chain transfer agent. Further, as can be understood from Table 2, AIBN was added for Entries 6 and 7. The monomer and the CT agent used as well as the results are summarized in Table 2.

Transesterification of Poly(Methyl Acrylate) with Hydroxyl-Functionalized iPP (Table 3, Entry 3).

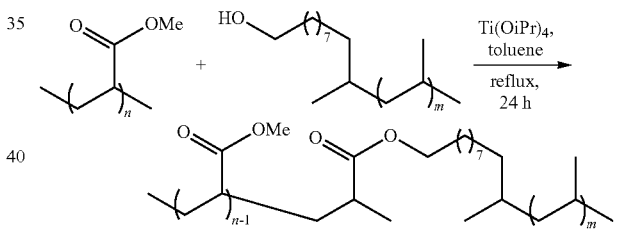

Ti(OiPr)$_4$ (3.19 mg, 11.2 µmol, diluted in 3 mL of toluene) was added to a solution of poly(C$_3$-co-C$_{11}$OH) (2.16 g, 50 µmol in 300 ml of toluene; Table 1., Entry 1.) at 100° C. After refluxing for one hour, a solution of poly(methyl acrylate) (0.16 g, 50 µmol (according to HT SEC) in 1 mL of toluene; (Table 2., Entry 1.) was added. After refluxing for 24 hours most of the solvent was removed under reduced pressure and the polymer was precipitated in cold methanol. The precipitate was mixed with THF and filtrated to remove unreacted polyacrylate. The remaining white solid was dried in a vacuum oven (60° C.). The conversion of OH groups reached 45% (based on $^1$H NMR). HT SEC (IR detector, o-DCB): $M_n$=42,900 g/mol, Đ=2.1 (Table 3, Entry 3).

Transesterification of Poly(Butyl Acrylate) with Hydroxyl-Functionalized iPP (Table 3, Entry 4).

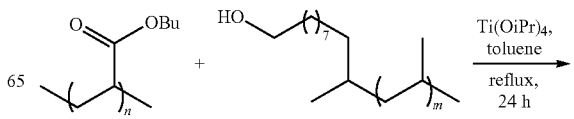

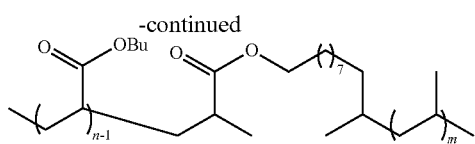

Ti(OiPr)$_4$ (3.19 mg, 11.2 μmol, diluted in 3 mL of toluene) was added to a solution of poly(C$_3$-co-C$_{11}$OH) (2.16 g, 50 μmol in 300 ml of toluene; Table 1., Entry 1.) at 100° C. After refluxing for one hour, a solution of poly(butyl acrylate) (0.52 g, 50 μmol; calculated according to HT SEC) in 3 mL of toluene (Table 2., Entry 2.) was added. After refluxing for 24 hours most of the solvent was removed under reduced pressure and the polymer was precipitated in cold methanol. The precipitate was mixed with THF and filtrated to remove unreacted polyacrylate. The remaining white solid was dried in a vacuum oven (60° C.). The conversion of OH groups of hydroxyl-functionalized polypropylene reached 40% (based on $^1$H NMR). HT SEC (IR detector, o-DCB): M$_n$=41,700 g/mol, Đ=2.1 (Table 3, Entry 4).

These experiments were repeated by varying the types and the amounts of the hydroxyl functionalized iPP and the polyacrylate and the catalyst type as shown in Table 3. The results are also summarized in Table 3.

Preparation of Polystyrene-Block-Poly(Methyl Acrylate) (Table 4, Entry 4).

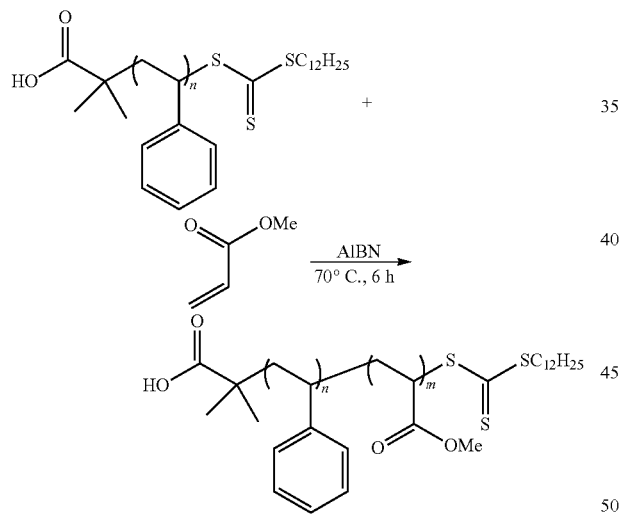

A solution of polystyrene prepared via RAFT polymerisation with DDMAT (42.0 g, 2.0 mmol, Table 2. Entry 6.), methyl acrylate (172.2 g, 2.0 mol), AIBN (32.8 mg, 0.2 mmol) and THF (275 ml) was degassed using three vacuum/nitrogen cycles and then was placed on a preheated reaction block at 70° C. After four hours, solvent and unreacted monomer were removed under reduced pressure and the crude product was precipitated in cold methanol and precipitated in dichloromethane/methanol. The resulting product was dried under vacuum at 70° C. to give a yellowish solid (yield: 34%), HT SEC (IR detector, o-DCB): M$_n$=16,500 g/mol, Đ=1.2; NMR: M$_n$=17,800 g/mol).

This experiment was repeated by varying the types of the polystyrene and the acrylate as shown in Table 4. The results are also summarized in Table 4.

Transesterification of Polystyrene-Block-Poly(Methyl Acrylate) with Hydroxyl-Functionalized iPP (Table 5, Entry 1)

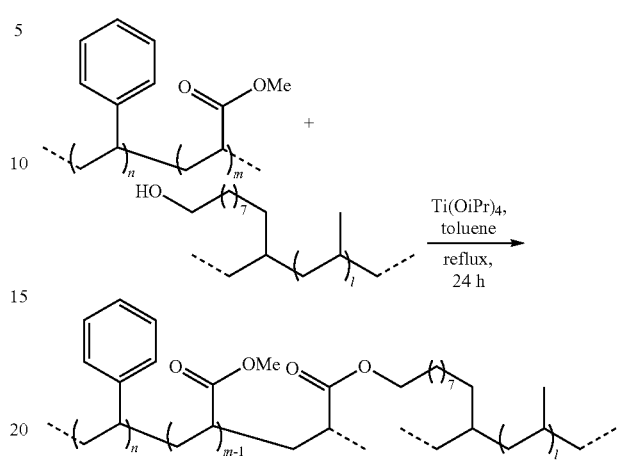

Ti(OiPr)$_4$ (37 μL, 0.13 mmol, diluted in 3 mL of toluene) was added to a solution of poly(C$_3$-co-C$_{11}$OH) (2.9 g, 50 μmol in 250 ml of toluene; Table 1., Entry 2.) at 100° C. After refluxing for one hour, a solution of polystyrene-block-poly(methyl acrylate) (4.9 g, 50 μmol (according to $^1$H NMR) in 50 mL of toluene; Table 4., Entry 1.) was added. After refluxing for 24 hours most of the solvent was removed under reduced pressure and the polymer was precipitated in cold methanol. The precipitate was dried and then unreacted polystyrene-block-poly(methyl acrylate) was removed using Soxhlet extraction with dichloromethane. The remaining pale yellow solid was dried in a vacuum oven (60° C.). The conversion of OH groups of hydroxyl-functionalized polypropylene reached 58% (93% poly(C$_3$-co-C$_{11}$OH) reacted with the block copolymer). HT SEC (IR detector, o-DCB): M$_n$=62,600 g/mol, Đ=2.5 (Table 5, Entry 1).

Transesterification of Polystyrene-Block-Poly(Methyl Acrylate) with Hydroxyl-Functionalized iPP by Reactive Extrusion (Table 5, Entry 9)

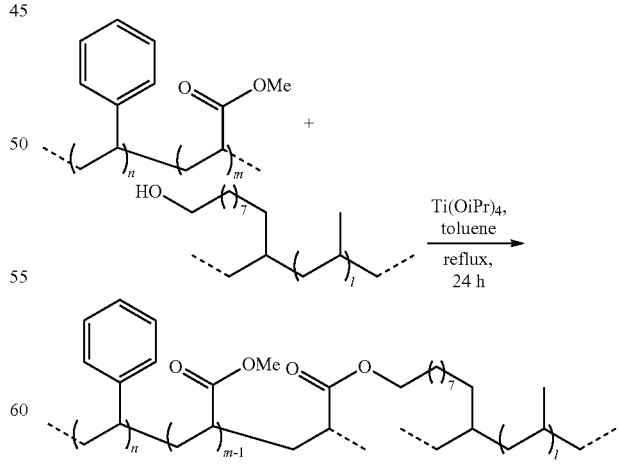

Ti(OiPr)$_4$ (1.19 g, 4.2 mmol, diluted in 3 mL of toluene) was added to a solution of dry poly(C$_3$-co-C$_6$-co-C$_{11}$OH) (8.0 g, 200 μmol in 250 ml of toluene; Table 1., Entry 4.) at 100° C. After refluxing for one hour, the solvent was evaporated. Such prepared product was subsequently processed with polystyrene-block-poly(methyl acrylate) (3.30 g, 200 µmol, Table 4., Entry 4) in the miniextruder at 190° C. for 10 minutes. The conversion of OH groups of hydroxyl-functionalized polypropylene reached 37% (48% poly($C_3$-co-$C_6$-co-$C_{11}$OH) reacted with the block copolymer). HT SEC (IR detector, o-DCB): $M_n$=37600 g/mol, Đ=2.8 (Table 5, Entry 9).

Transesterification of Polystyrene-Block-Poly(Butyl Acrylate) with Hydroxyl Functionalized iPP (Table 5, Entry 2)

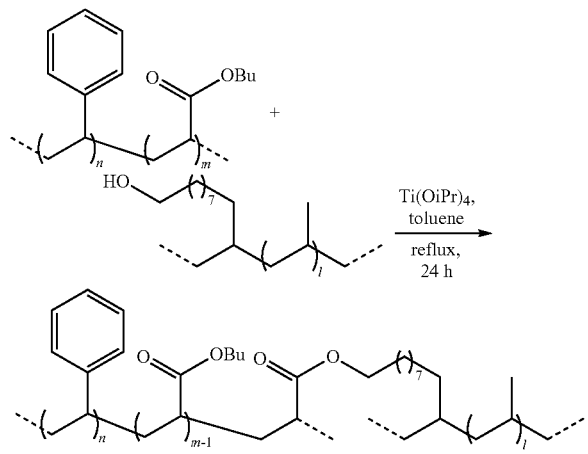

Ti(OiPr)$_4$ (37 µL, 0.13 mmol, diluted in 3 mL of toluene) was added to a solution of poly($C_3$-co-$C_{11}$OH) (2.9 g, 50 µmol in 250 ml of toluene; Table 1., Entry 2.) at 100° C. After refluxing for one hour, a solution of polystyrene-block-poly(butyl acrylate) (3.8 g, 50 µmol (according to $^1$H NMR) in 50 mL of toluene Table 4., Entry 2.) was added. After refluxing for 24 hours most of the solvent was removed under reduced pressure and the polymer was precipitated in cold methanol. The precipitate was dried and then unreacted polystyrene-block-poly(butyl acrylate) was removed using Soxhlet extraction with dichloromethane. The remaining pale yellow solid was dried in a vacuum oven (60° C.). The conversion of OH groups of hydroxyl-functionalized polypropylene reached 56% (90% of poly($C_3$-co-$C_{11}$OH) reacted with the block copolymer). HT SEC (IR detector, o-DCB): $M_n$=76,200 g/mol; Đ=2.5 (Table 5, Entry 2).

This experiment was repeated by varying the types and the amounts of the hydroxyl functionalized iPP and the type of PS-b-PA and the catalyst type as shown in Table 5. The results are also summarized in Table 5.

Typical procedure for the preparation of PP/PS blends. Isotactic PP (PP500P, 8.0 g) and PS (2.0 g) with antioxidant Irganox 1010 (2500 ppm) were fed into a corotating twin-screw mini-extruder at 240° C. with a screw rotation rate set at 100 rpm. The mixture was processed for 5 minutes. Afterwards the mixture was evacuated directly to a mini-injection molding machine and the obtained blends were tested in terms of their morphology and mechanical properties.

Typical procedure for the preparation of PP/PS blends compatibilized by PS-b-PMA-graft-PP. Isotactic PP (PP500P, 8.0 g), PS (2.0 g), antioxidant Irganox 1010 (2500 ppm) and PS-b-PMA-g-PP (Tab 5., Entry 1.) compatibilizer (0.5 g) were fed into a corotating twin-screw mini-extruder at 240° C. with a screw rotation rate set at 100 rpm. The mixture was processed for 5 minutes. Afterwards the mixture was evacuated directly to a mini-injection molding machine and the obtained blends were tested in terms of their morphology and mechanical properties.

Mechanical properties of the obtained compositions were measured as summarized in Table 6. The tensile modulus, stress at yield, elongation at break of the composition comprising the compatibilizer (Entry 3) were higher than those of the composition without the compatibilizer (Entry 2). Moreover, a much higher uniformity was obtained in the properties of the compositions comprising the compatibilizer.

TABLE 1

Hydroxyl-functionalized polypropylenes used in transesterification of polyacrylates.

| Entry | Composition | $M_n$ [g/mol] | Đ | OH/ chain | OH [mol %] |
|---|---|---|---|---|---|
| 1. | poly($C_3$-co-$C_{11}$OH) | 43,200 | 2.0 | 1.6 | 0.15 |
| 2. | poly($C_3$-co-$C_{11}$OH) | 57,900 | 2.2 | 1.6 | 0.12 |
| 3. | poly($C_3$-co-$C_{11}$OH) | 58,500 | 2.2 | 1.6 | 0.12 |
| 4. | poly($C_3$-co-$C_6$-co-$C_{11}$OH) | 40,000 | 2.3 | 1.4 | 0.13 |
| 5. | poly($C_3$-co-$C_6$-co-$C_{11}$OH) | 85.500 | 2.0 | 1.6 | 0.08 |
| 6. | poly($C_3$-co-$C_{11}$OH) | 52,600 | 2.1 | 5.1 | 0.41 |

$M_n$ and Đ values are determined by HT SEC.

TABLE 2

Acrylates and styrene polymerisations.

| Entry | Substrates | CT agent | Yield [%] | $M_n$ [g/mol] | Đ |
|---|---|---|---|---|---|
| 1. | methyl acrylate | AIBN (0.012M) | dodecanethiol (0.0025M) | 80 | 3,200 | 2.0 |
| 2. | butyl acrylate | AIBN (0.012M) | dodecanethiol (0.0025M) | 87 | 9,800 | 2.4 |
| 3. | styrene | — | DDMAT (0.1% mol) | 36 | 22,000 | 1.2 |
| 4. | styrene | — | DDMAT (0.1% mol) | 38 | 21,000 | 1.2 |
| 5. | styrene | — | DDMAT (0.1% mol) | 72[a] | 56,400 | 1.2 |
| 6. | styrene | AIBN (50 ppm) | DDMAT (0.2% mol) | 33[b] | 10,800 | 1.3 |
| 7. | styrene | AIBN (100 ppm) | DDMAT (0.4% mol) | 41 | 7,000 | 1.3 |

[a]reaction performed for 17 h;
[b]reaction performed for 4 h;
$M_n$ and Đ values determined from HT SEC

TABLE 3

Transesterifications of polyacrylates with hydroxyl-functionalized iPP.

| | Substrates | | | | | Product | | | |
|---|---|---|---|---|---|---|---|---|---|
| Entry | iPP-co-C$_{11}$OH | Amount [μmol] | polyacrylate | Amount [μmol] | catalyst substance | Conversion [%]$^b$ | iPP chains reacted | M$_n$ [g/mol] | Đ |
| 1. | Table 1, Entry 1. | 50 | Table 2, Entry 1. | 50 | TBD (1.5 eq)$^a$ | 40 | 64 | 44,900 | 2.0 |
| 2. | Table 1, Entry 1. | 50 | Table 2, Entry 2. | 50 | TBD (1.5 eq)$^a$ | 39 | 62 | 35,400 | 2.5 |
| 3. | Table 1, Entry 1. | 50 | Table 2, Entry 1. | 50 | Ti(OiPr)$_4$ (1.5 eq)$^a$ | 45 | 72 | 42,900 | 2.1 |
| 4. | Table 1, Entry 1. | 50 | Table 2, Entry 2. | 50 | Ti(OiPr)$_4$ (1.5 eq)$^a$ | 40 | 64 | 41,700 | 2.1 |
| 5. | Table 1, Entry 1. | 50 | Table 2, Entry 1. | 50 | TMA (1 eq)$^a$ | 48 | 77 | 41,400 | 2.2 |
| 6. | Table 1, Entry 1. | 50 | Table 2, Entry 2. | 50 | TMA (1 eq)$^a$ | 57 | 91 | 39,700 | 2.3 |
| 7. | Table 1, Entry 3. | 300 | Table 2, Entry 1. | 300 | Ti(OiPr)$_4$ (1.5 eq)$^a$ | 36 | 58 | 58,100 | 2.3 |
| 8. | Table 1, Entry 6. | 50 | Table 2, Entry 1. | 50 | TBD (15 eq)$^a$ | — | — | Cross-linked | — |

$^a$equivalents per OH group in hydroxyl-functionalized iPP;
$^b$conversion of hydroxyl groups of hydroxyl-functionalized iPP determined from $^1$H NMR;
M$_n$ and Đ values determined from HT SEC

TABLE 4

Block copolymers preparation.

| | Substrates | | | | | Product | | |
|---|---|---|---|---|---|---|---|---|
| Entry | polystyrene | Amount [mmol] | acrylate | Amount [mol] | Catalyst | Yield [%] | M$_n$ [g/mol] | Đ |
| 1. | Table 2. Entry 3. | 0.41 | methyl acrylate | 0.41 | AIBN (100 ppm) | 96 | 12,000 | 2.3 |
| 2. | Table 2. Entry 4. | 0.41 | butyl acrylate | 0.41 | AIBN (100 ppm) | 50 | 33,300 | 1.8 |
| 3. | Table 2. Entry 5. | 0.41 | methyl acrylate | 0.41 | AIBN (100 ppm) | 41 | 37,000 | 1.6 |
| 4. | Table 2. Entry 6. | 2.1 | methyl acrylate | 2.1 | AIBN (100 ppm) | 34 | 16,500 | 1.2 |
| 5. | Table 2. Entry 7. | 0.41 | methyl acrylate | 0.41 | AIBN (100 ppm) | 34 | 6,400 | 1.2 |

M$_n$ and Đ values determined from HT SEC;

TABLE 5

Terpolymers preparations.

| | Substrates | | | | | Product | | | |
|---|---|---|---|---|---|---|---|---|---|
| | | | | | | OH | iPP | | |
| Entry | iPP-co-C$_{11}$OH | Amount [μmol] | PS-b-PA | Amount [μmol] | Catalyst | conversion [%]$^b$ | conversion [%]$^c$ | M$_n$ [g/mol] | Đ |
| 1. | Table 1. Entry 2. | 50 | Table 4. Entry 1. | 50 | Ti(OiPr)$_4$ (1.5 eq)$^a$ | 58 | 93 | 62,600 | 2.5 |
| 2. | Table 1. Entry 2. | 50 | Table 4. Entry 2. | 50 | Ti(OiPr)$_4$ (1.5 eq)$^a$ | 56 | 90 | 76,200 | 2.5 |
| 3. | Table 1. Entry 3. | 300 | Table 4. Entry 3. | 300 | Ti(OiPr)$_4$ (1.5 eq)$^a$ | 49 | 78 | 56,800 | 2.3 |
| 4. | Table 1. Entry 4. | 50 | Table 4. Entry 1. | 150 | TMA (1.5 eq)$^a$ | 63 | 88 | 46,200 | 2.1 |
| 5. | Table 1. Entry 4. | 50 | Table 4. Entry 4. | 150 | Ti(OiPr)$_4$ (1.5 eq)$^a$ | 69 | 97 | 43,700 | 2.4 |
| 6. | Table 1. Entry 5. | 300 | Table 4. Entry 2. | 300 | Ti(OiPr)$_4$ (1.5 eq)$^a$ | 59 | 94 | 65,200 | 2.5 |
| 7. | Table 1. Entry 6. | 50 | Table 4. Entry 1. | 50 | Ti(OiPr)$_4$ (15 eq)$^a$ | Cross-linked | n.a. | n.a. | |
| 8. | Table 1. Entry 5. | 300 | Table 4. Entry 1. | 300 | Ti(OiPr)$_4$ (1.5 eq)$^a$ | 58 | 93 | 62,300 | 2.7 |
| 9 | Table 1. Entry 4. | 200 | Table 4. Entry 4. | 200 | Ti(OiPr)$_4$ (15 eq)$^a$ | 37 | 48 | 37,600 | 2.8 |

$^a$equivalents per OH group in hydroxyl-functionalized iPP;
$^b$conversion of hydroxyl groups of hydroxyl-functionalized iPP determined from $^1$H NMR;
$^c$percentage of iPP reacted with styrene-acrylate block-copolymer;
M$_n$ and Đ values determined from HT SEC
d) determined from $^1$HNMR;

TABLE 6

Tensile test results of PP500, PP500P/PS blend and PP500P/PS blend compatibilised compatibilized by Tab 5, Entry 1.

| Entry | Composition | Tensile modulus [MPa] | Stress at yield [MPa] | Elongation at break [%] |
|---|---|---|---|---|
| 1. | PP500P | 1428.97 ± 99.60 | 35.86 ± 0.83 | 320.18 ± 20.60 |
| 2. | PP500P + PS | 2204.40 ± 119.64 | 45.82 ± 0.93 | 135.14 ± 16.59 |
| 3. | PP500P + PS + compatibiliser | 2266.73 ± 59.24 | 46.53 ± 0.14 | 135.33 ± 5.96 |

FIGS. 1-4 show AFM images of spin-coated copolymer samples.

FIG. 5 shows SEM images exhibiting morphology of PP500/PS blend and PP500/PS blend compatibilised by (Table 5, Entry 1.) Red arrow indicates the PS domains visualized in the PP matrix.

The invention claimed is:

1. A process for the preparation of a polyacrylate-based graft copolymer comprising a polyacrylate backbone and polyolefin side chains grafted thereon, wherein the graft copolymer is prepared by reacting a first polymer and a second polymer, wherein the first polymer comprises recurring units having the structure (I) and optionally further recurring units having the structures (II):

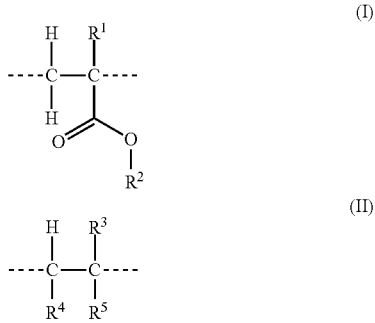

wherein $R^1$, $R^3$ is H or $CH_3$ and $R^2$ is a hydrocarbon moiety comprising 1 to 6 carbon atoms, one of $R^4$ and $R^5$ is H and the other one of $R^5$ and $R^4$ is $COOR^2$, C≡N, Cl, or an aliphatic or aromatic hydrocarbon moiety optionally containing one or multiple hetero atom functionalities, wherein $R^2$ in (I) is different from $R^2$ in (II), and the second polymer is a functionalized polyolefin having one or multiple hydroxyl functional groups, wherein the graft copolymer is formed by transesterification of the $COOR^2$ group of (I) or (II) with the hydroxyl functional group of the functionalized polyolefin, the process comprising the step of reacting the first polymer with the second polymer by means of transesterification.

2. The process according to claim 1, wherein
the second polymer is obtained by a process comprising the steps of:
(F) grafting onto the backbone of a polyolefin at least one compound comprising at least one amine-reactive group to form a grafted polyolefin and
(G) reacting an alkanolamine with the grafted polyolefin before the step of reacting the first polymer and the second polymer.

3. The process according to claim 1, wherein the transesterification reaction of the polyacrylate and the functionalized polyolefin is performed by reactive melt extrusion or by a solution process.

4. The process according to claim 1, wherein (I) of the first polymer is derived from a monomer selected from the group consisting of methyl acrylate, methyl methacrylate, ethyl acrylate, ethyl methacrylate, propyl acrylate, propyl methacrylate, butyl acrylate, butyl methacrylate, t-butyl acrylate, t-butyl methacrylate, isobutyl acrylate, isobutyl methacrylate, isopropyl acrylate, isopropyl methacrylate, hydroxyethyl methacrylate, hydroxypropyl acrylate, dimethylaminomethyl acrylate, dimethylaminopropyl acrylate, dimethylaminopropyl methacrylate, dimethylaminomethyl methacrylate, glycidyl methacrylate, diethylene glycol diacrylate and combinations thereof.

5. The process according to claim 1, wherein (II) of the first polymer is derived from a monomer selected from the group consisting of methyl acrylate, methyl methacrylate, ethyl acrylate, ethyl methacrylate, propyl acrylate, propyl methacrylate, butyl acrylate, butyl methacrylate, t-butyl acrylate, t-butyl methacrylate, isobutyl acrylate, isobutyl methacrylate, isopropyl acrylate, isopropyl methacrylate, hydroxyethyl methacrylate, hydroxypropyl acrylate, dimethylaminomethyl acrylate, dimethylaminopropyl acrylate, dimethylaminopropyl methacrylate, dimethylaminomethyl methacrylate, glycidyl methacrylate, diethylene glycol diacrylate, styrene, α-methylstyrene, vinyl toluene, vinyl pyridine, chlorostyrene, acrylonitrile, 2-isopropenyt-2-oxazoline, N-vinyl pyrrolidinone, vinyl acetate, vinyl chloride, dimethyl maleate, diethyl maleate, dibutyl maleate, dicyclohexyl maleate, diisobutyl maleate, dioctadecyl maleate, dimethyl fumarate, diethyl fumarate, dibutyl fumarate, dimethylitaconate, diethylitaconate, dibutylitaconate, butadiene, isoprene and combinations thereof.

6. The process according to claim 1, wherein the first polymer is a block copolymer comprising a polyacrylate block and a polystyrene block.

7. The process according to claim 1, wherein the fraction of the recurring unit (I) in the recurring units of the first polymer is at least 10%.

8. The process according to claim 1, wherein the polyolefin of the second polymer is a propylene-based polymer, an ethylene-based polymer or an ethylene-propylene rubber.

9. The process according to claim 1, wherein the second polymer has on average n functional groups per chain, wherein n is 0.5 to 5.0 as determined by $^1$H NMR spectroscopy.

10. The process according to claim 1, wherein the second polymer is a copolymer comprising a polyolefin main chain and one or multiple functionalized short chain branches.

11. The process according to claim 10, wherein the second polymer is obtained by a process comprising the steps of:
(D) copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising: i) a metal catalyst or metal catalyst precursor comprising a metal from Group 3-10 of the IUPAC Periodic Table of elements; and ii) optionally a co-catalyst;

(E) reacting the polyolefin obtained in step D) with at least one metal substituting agent to obtain a polyolefin main chain having one or multiple functionalized short chain branches, wherein the functionalized chain end comprises a hydroxyl group.

12. The process according to claim 11, wherein the at least one second type of metal-pacified functionalized olefin monomer is a compound according to Formula III:

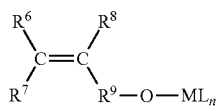

Formula (III)

wherein $R^6$, $R^7$ and $R^8$ are each independently selected from the group consisting of H or hydrocarbyl with 1 to 16 carbon atoms, and wherein $R^9$—O-$ML_n$ is a main group metal pacified hydroxyl functional group, wherein $R^9$ is a hydrocarbyl with 1 to 16 carbon atoms;

wherein M is the pacifying metal, preferably selected from the group consisting of: magnesium, calcium, boron, aluminum, gallium, bismuth, titanium, zinc, and one or more combinations thereof;

wherein ligand L is independently selected from the group consisting of hydride, hydrocarbyl, halide, alkoxide, aryloxide, amide, thiolate, mercaptate, carboxylate, carbamate, salen, salan, salalen, guanidinate, porphyrin, beta-ketiminate, phenoxy-imine, phenoxy-amine, bisphenolate, trisphenolate, alkoxyamine, alkoxyether, alkoxythioether, subcarbonate and subsalicylate or combinations thereof;

wherein n is 1, 2 or 3.

13. The process according to claim 1, wherein the second copolymer is a propylene-based polymer, wherein the second polymer has on average n functional groups per chain, wherein n is on average 1.0 to 4.0 as determined by $^1$H NMR spectroscopy.

14. The process according to claim 1, wherein the second polymer is a polyolefin containing at least one functionalized chain end.

15. The process according to claim 1, wherein the second polymer is obtained by a process comprising the steps of:

(A) polymerizing at least one type of olefin monomer using a catalyst system to obtain a first polyolefin containing a main group metal on at least one chain end; the catalyst system comprising i) a metal catalyst or metal catalyst precursor comprising a metal from Group 3-10 of the IUPAC Periodic Table of elements; and ii) at least one type of chain transfer agent; and iii) optionally a co-catalyst, and (B) reacting the first polyolefin containing a main group metal on at least one chain end obtained in step A) with at least one type of oxidizing agent and subsequently at least one type of metal substituting agent to obtain the polyolefin containing at least one functionalized chain end which comprises a hydroxyl group.

16. The process according to claim 1, wherein the second polymer is obtained by a process comprising the steps of:

(F) grafting onto the backbone of a polyolefin at least one compound comprising at least one amine-reactive group to form a grafted polyolefin and (G) reacting an alkanolamine with the grafted polyolefin.

17. The process according to claim 1, wherein the first polymer has a number average molecular weight ($M_n$) of 2 to 150 kg/mol.

18. The process according to claim 1, wherein the second polymer has a number average molecular weight ($M_n$) of 1 to 300 kg/mol.

19. The process according to claim 1, wherein the molar ratio between the first polymer and the second polymer is 4:1 to 1:10.

* * * * *